(12) United States Patent
Kim

(10) Patent No.: US 10,365,118 B2
(45) Date of Patent: Jul. 30, 2019

(54) NAVIGATION INTERWORKING APPARATUS FOR MOBILE TERMINAL AND RECORDING MEDIUM FOR MOBILE DEVICE

(71) Applicant: HYUNDAI MOTOR COMPANY, Seoul (KR)

(72) Inventor: Seon Su Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 614 days.

(21) Appl. No.: 14/955,879

(22) Filed: Dec. 1, 2015

(65) Prior Publication Data

US 2017/0045368 A1  Feb. 16, 2017

(30) Foreign Application Priority Data

Aug. 13, 2015  (KR) .................. 10-2015-0114651

(51) Int. Cl.
*G01C 21/36*  (2006.01)

(52) U.S. Cl.
CPC ................... *G01C 21/362* (2013.01)

(58) Field of Classification Search
None
See application file for complete search history.

(56) References Cited

U.S. PATENT DOCUMENTS

| 2002/0040271 | A1* | 4/2002 | Park | G01C 21/36 701/468 |
| 2002/0161519 | A1* | 10/2002 | Mori | G01C 21/3407 701/410 |
| 2011/0077854 | A1* | 3/2011 | Fushiki | G01C 21/3469 701/533 |

FOREIGN PATENT DOCUMENTS

| JP | 2002-318124 A | 10/2002 |
| JP | 2004-239918 A | 8/2004 |
| JP | 2015-105072 A | 6/2015 |
| KR | 10-2014-0007140 A | 1/2014 |
| KR | 10-2014-0019978 A | 2/2014 |
| KR | 10-2015-0016751 A | 2/2015 |

* cited by examiner

*Primary Examiner* — Todd M Melton
*Assistant Examiner* — Jason R Roberson
(74) *Attorney, Agent, or Firm* — Morgan Lewis & Bockius LLP

(57) ABSTRACT

A navigation interworking apparatus for a mobile terminal which is connected to a navigation server through a first communication network and connected to a vehicle terminal through a second communication network includes a setting unit which sets a point of departure and a destination, a route requesting unit which transmits the set point of departure and the set destination to the navigation server, a first communication unit, a second communication unit, a first guiding unit which outputs the first driving route, a route comparing unit which compares the first driving route and the second driving route, and a guide control unit which ends outputting of the first driving route when the first driving route and the second driving route coincide with each other as the comparison result.

4 Claims, 6 Drawing Sheets

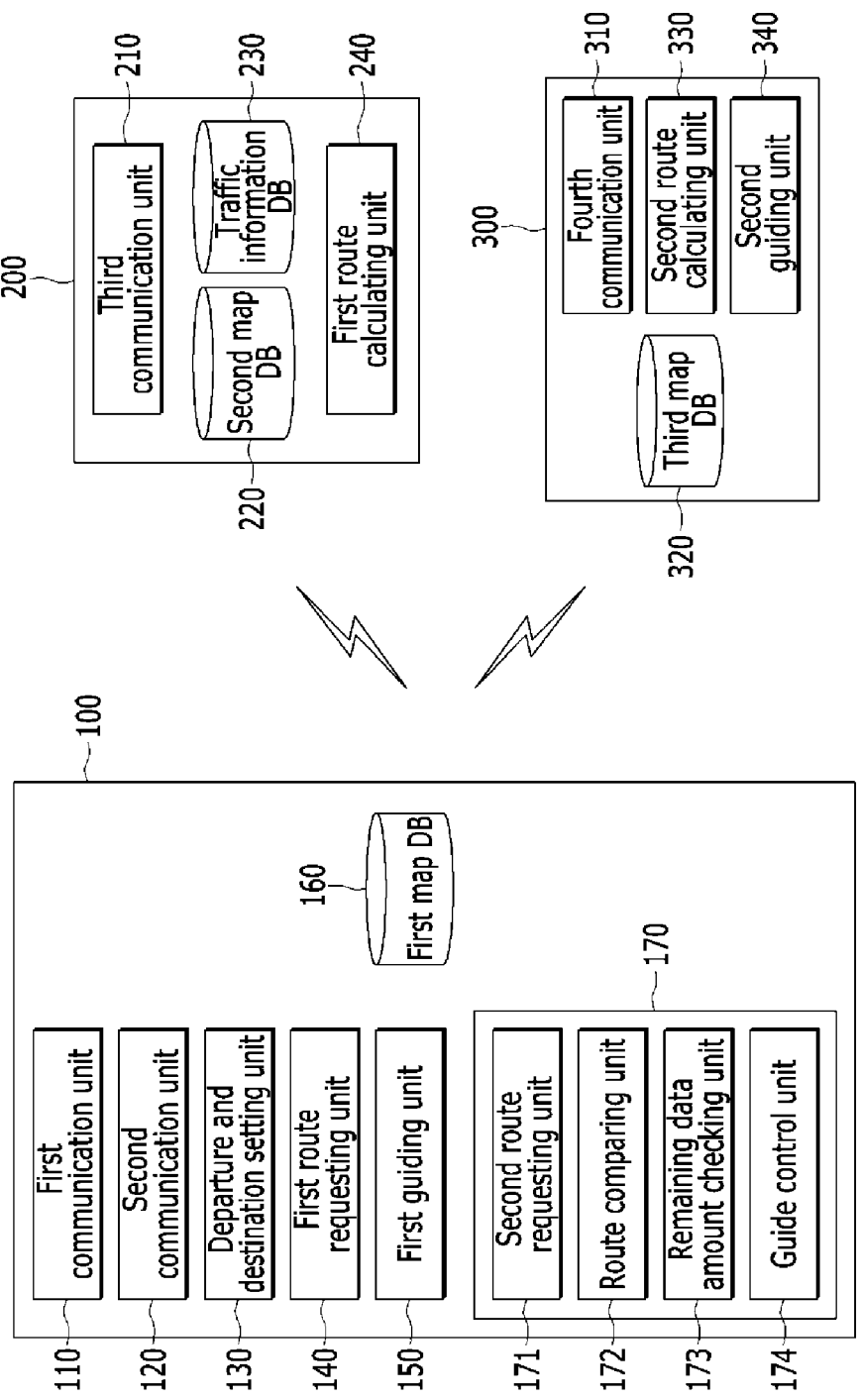

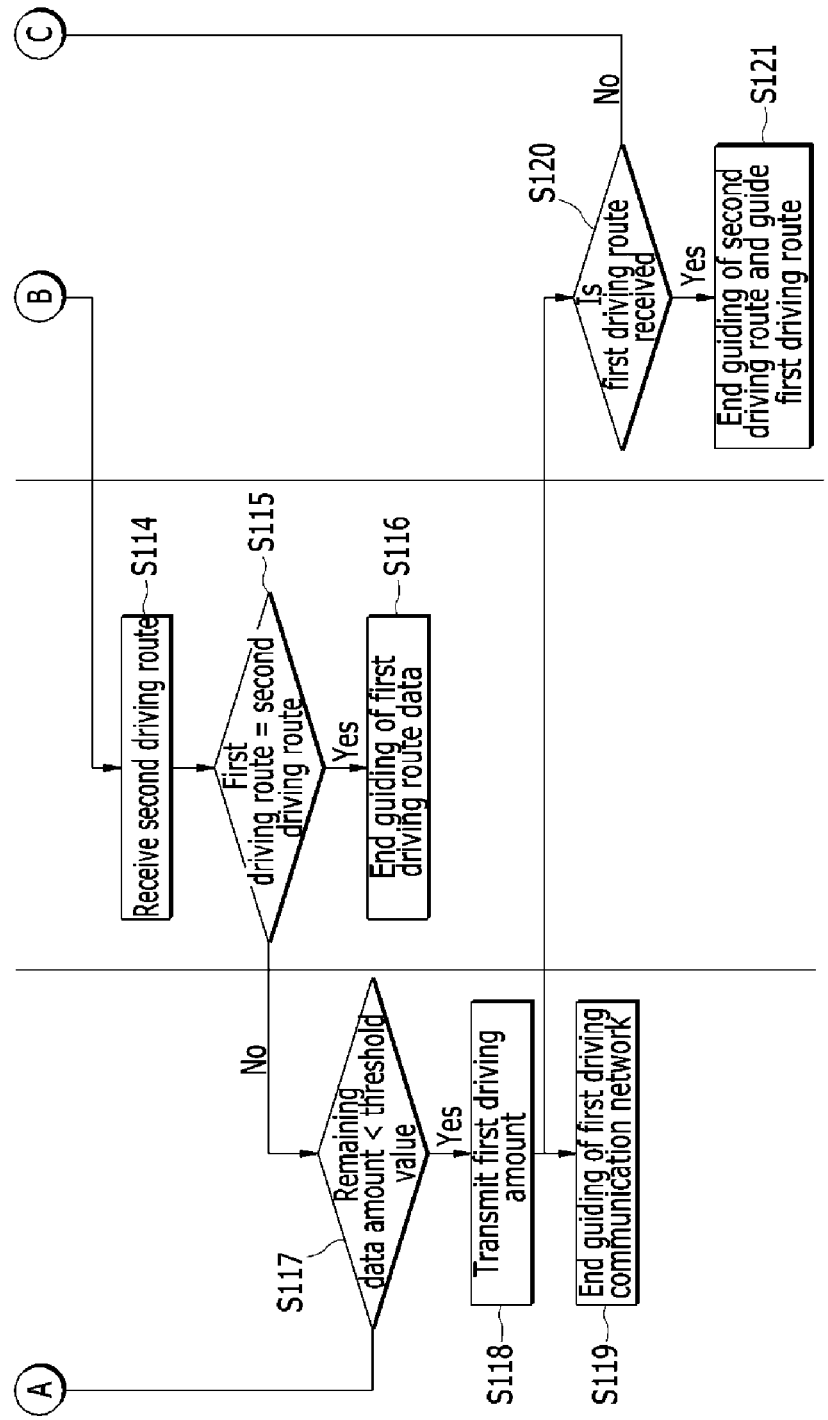

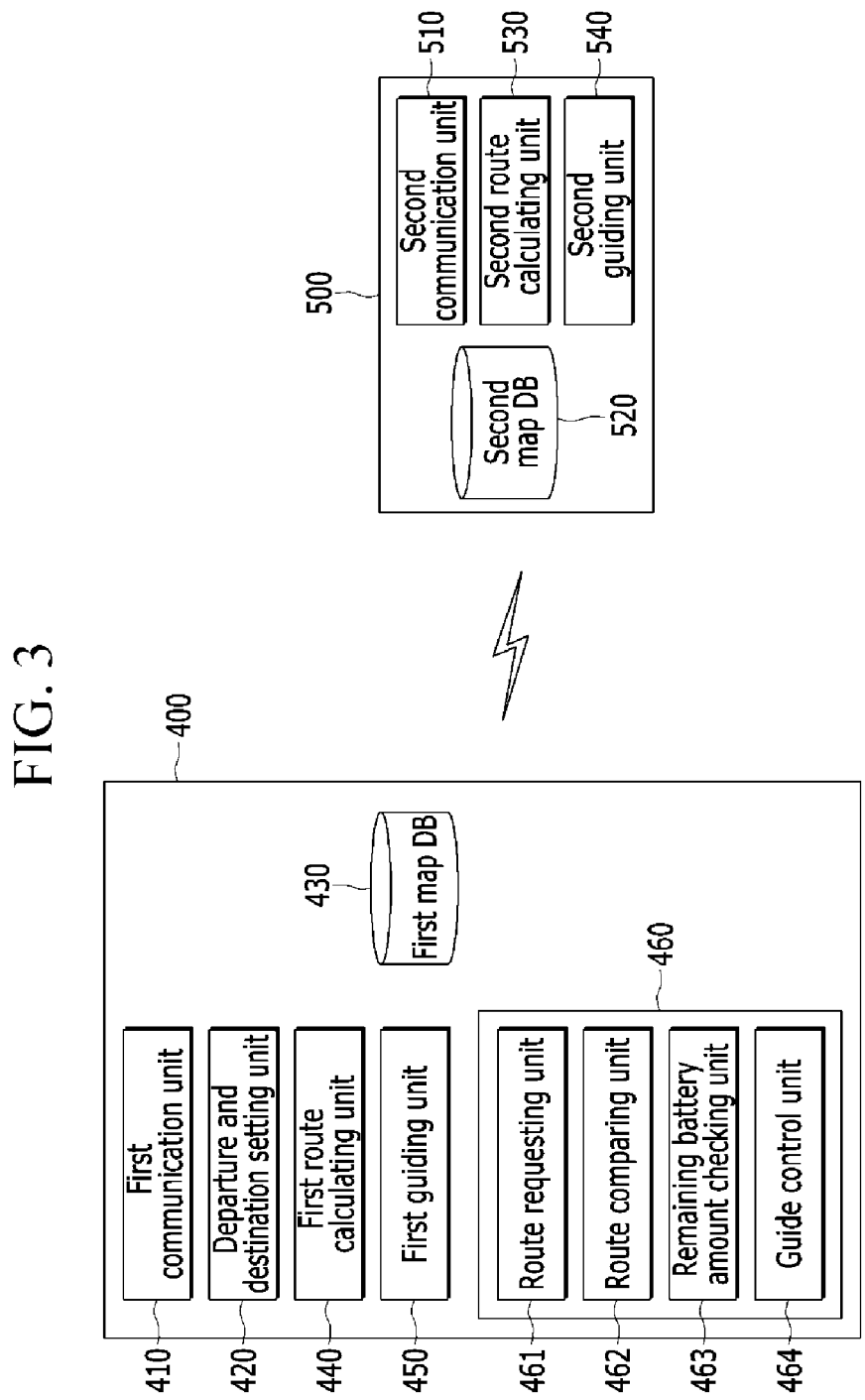

NAVIGATION INTERWORKING APPARATUS FOR MOBILE TERMINAL AND RECORDING MEDIUM FOR MOBILE DEVICE

CROSS-REFERENCE TO RELATED APPLICATION

This application claims the benefit of priority to Korean Patent Application No. 10-2015-0114651, filed with the Korean Intellectual Property Office on Aug. 13, 2015, the entire contents of which are incorporated herein by reference.

TECHNICAL FIELD

The present disclosure relates to a navigation interworking apparatus for a mobile terminal and a recording medium in which a navigation interworking method is implemented, and more particularly, to a navigation interworking apparatus which provides route information using a navigation of a mobile terminal or a navigation of a vehicle terminal in the vehicle and a recording medium in which a navigation interworking method is implemented.

BACKGROUND

Recently, the use of a mobile terminal which provides voice call, video call, data communication, photographs or moving image capturing, music or video file reproducing, game playing, broadcast receiving, and navigation functions in vehicles is increasing. Particularly, the navigation function of the mobile terminal is easily updated to provide best route information to which real time traffic information is reflected.

However, the mobile terminal provides the route information through a small size screen so that readability by the user is low and the provided real time route information is received from a navigation server, so that the users need to pay for data communication costs. Further, the mobile terminal may perform multitasking, have some applications which operate in the background without being noticed by the user, and always perform base functions such as internet connection or data communication (for example, Bluetooth, global positioning system GPS, or Wi-Fi) so that a battery may be quickly consumed. Therefore, it is difficult to provide the route information continuously for a long time. For this reason, the battery of the mobile terminal is charged using a charger of a vehicle or a wireless charger, but a charging speed is slow and the mobile terminal may be overheated in some cases.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a navigation interworking apparatus which interworks a navigation of a mobile terminal with a navigation of a vehicle terminal in the vehicle to provide route information through the mobile terminal or the vehicle terminal and a recording medium in which the navigation interworking method is implemented.

The exemplary embodiments according to the present disclosure may be used to achieve objects which are not specifically mentioned other than the above object.

An exemplary embodiment of the present disclosure provides a navigation interworking apparatus for a mobile terminal which is connected to a navigation server through a first communication network and connected to a vehicle terminal through a second communication network including: a setting unit which sets a point of departure and a destination, a route requesting unit which transmits the set point of departure and the set destination to the navigation server, a first communication unit which receives a first driving route corresponding to the point of departure and the destination which are transmitted from the navigation server, a second communication unit which receives a second driving route corresponding to the point of departure and the destination from the vehicle terminal, a first guiding unit which outputs the first driving route, a route comparing unit which compares the first driving route and the second driving route, and a guide control unit which ends outputting of the first driving route when the first driving route and the second driving route coincide with each other as the comparison result.

Here, the vehicle terminal may include a route calculating unit which calculates a second driving route corresponding to the point of departure and the destination and a second guiding unit which outputs the first driving route or the second driving route.

Further, the vehicle terminal may further include a third communication unit which receives the point of departure and the destination from the mobile terminal.

Further, the apparatus further includes a remaining data amount checking unit which compares a remaining data amount of the mobile terminal and a predetermined threshold value, in which a guide control unit ends outputting of the first driving route when the remaining data amount is smaller than the threshold value as a result of checking a remaining data amount.

The navigation interworking apparatus may further include a remaining battery amount checking unit which compares a remaining battery amount of the mobile terminal and a predetermined threshold value and when the remaining data amount is smaller than the threshold value as a result of checking the remaining battery amount, the guide control unit ends outputting of the first driving route.

Another exemplary embodiment of the present disclosure provides a navigation interworking apparatus for a mobile terminal which is connected to a navigation server through a first communication network and connected to a vehicle terminal through a second communication network, including: a setting unit which sets a point of departure and a destination; a route requesting unit which transmits the set point of departure and the set destination to the navigation server; a communication unit which receives a driving route corresponding to the point of departure and the destination which are transmitted from the navigation server; a guiding unit which outputs the driving route; a remaining battery amount checking unit which checks a remaining battery amount of the mobile terminal; and a guide control unit which ends outputting of the driving route and transmits the driving route to the vehicle terminal when the remaining battery amount of the mobile terminal is smaller than a predetermined threshold value as a checking result.

Here, the first communication network may be a broadband wireless communication network.

Further, the second communication network may be a short range wireless communication network.

One exemplary embodiment of the present disclosure provides a navigation interworking apparatus for a mobile terminal which is connected to a vehicle server through a wired/wireless communication network, including a setting unit which sets a point of departure and a destination, a first route calculating unit which calculates a first driving route corresponding to the set point of departure and the set destination, a first guiding unit which outputs the first driving route, a first communication unit which receives a second driving route corresponding to the point of departure and the destination from the vehicle terminal, a route comparing unit which compares the first driving route and the second driving route, and a guide control unit which ends outputting of the first driving route when the first driving route and the second driving route coincide with each other as the comparison result.

Here, the vehicle terminal may include a second route calculating unit which calculates a second driving route corresponding to the point of departure and the destination and a second guiding unit which outputs the calculated second driving route.

Further, the vehicle terminal may further include a second communication unit which receives the point of departure and the destination transmitted from the mobile terminal.

Furthermore, the apparatus may further include a remaining battery amount checking unit which compares a remaining battery amount of the mobile terminal and a predetermined threshold value in which wherein when the remaining battery amount is smaller than the threshold value as a result of checking the remaining battery amount, the guide control unit ends outputting of the first driving route.

Another exemplary embodiment of the present disclosure provides a recording medium storing a program which is executed in a navigation interworking apparatus for a mobile terminal which is connected to a navigation server through a first communication network and connected to a vehicle terminal through a second communication network, the program performs a function of setting a point of departure and a destination, a function of transmitting the set point of departure and the set destination to the navigation server, a function of receiving a second driving route corresponding to the point of departure and the destination from the vehicle terminal, a function of outputting the first driving route, a function of comparing the first driving route and the second driving route, and ending the outputting of the first driving route when the first driving route coincides with the second driving route as a comparison result.

The program may further perform a function of transmitting the first driving route to the vehicle terminal when the first driving route coincides with the second driving route as a comparison result.

The program may further perform a function of comparing a remaining data amount of the mobile terminal and a predetermined threshold value; and a function of transmitting the first driving route to the vehicle terminal when the remaining data amount of the mobile terminal is smaller than the threshold value.

The program may further include a function of comparing the remaining battery amount of the mobile terminal and a predetermined threshold value; and a function of transmitting the first driving route to the vehicle terminal when the remaining battery amount of the mobile terminal is smaller than the threshold value as a comparison result.

Another exemplary embodiment of the present disclosure provides a recording medium storing a program which is executed in a navigation interworking apparatus for a mobile terminal which is connected to a vehicle terminal through a wired/wireless communication network, the program performs, a function of setting a point of departure and a destination; a function of calculating a first driving route corresponding to the set point of departure, a function of outputting the first driving route; a function of receiving a second driving route corresponding to the point of departure and the destination from the vehicle terminal; a function of comparing the first driving route and the second driving route; and a function of ending the outputting of the first driving route when the first driving route coincides with the second driving route as a comparison result.

The program may further include a function of transmitting the first driving route to the vehicle terminal when the first driving route coincides with the second driving route as a comparison result.

The program may further include a function of comparing a remaining battery amount of the mobile terminal and a predetermined threshold value; and a function of ending the outputting of the first driving route when the remaining battery amount of the mobile terminal is smaller than the threshold value.

According to an exemplary embodiment of the present disclosure, when the navigation of the mobile terminal is used in the vehicle, consumption of a battery and data of the mobile terminal may be reduced.

BRIEF DESCRIPTION OF THE DRAWINGS

FIG. 1 illustrates a configuration of a navigation interworking apparatus according to an exemplary embodiment of the present disclosure.

FIG. 2A and FIG. 2B illustrate a navigation interworking method using the navigation interworking apparatus of FIG. 1.

FIG. 3 illustrates a configuration of a navigation interworking apparatus according to another exemplary embodiment of the present disclosure.

DETAILED DESCRIPTION

Figure 2A:
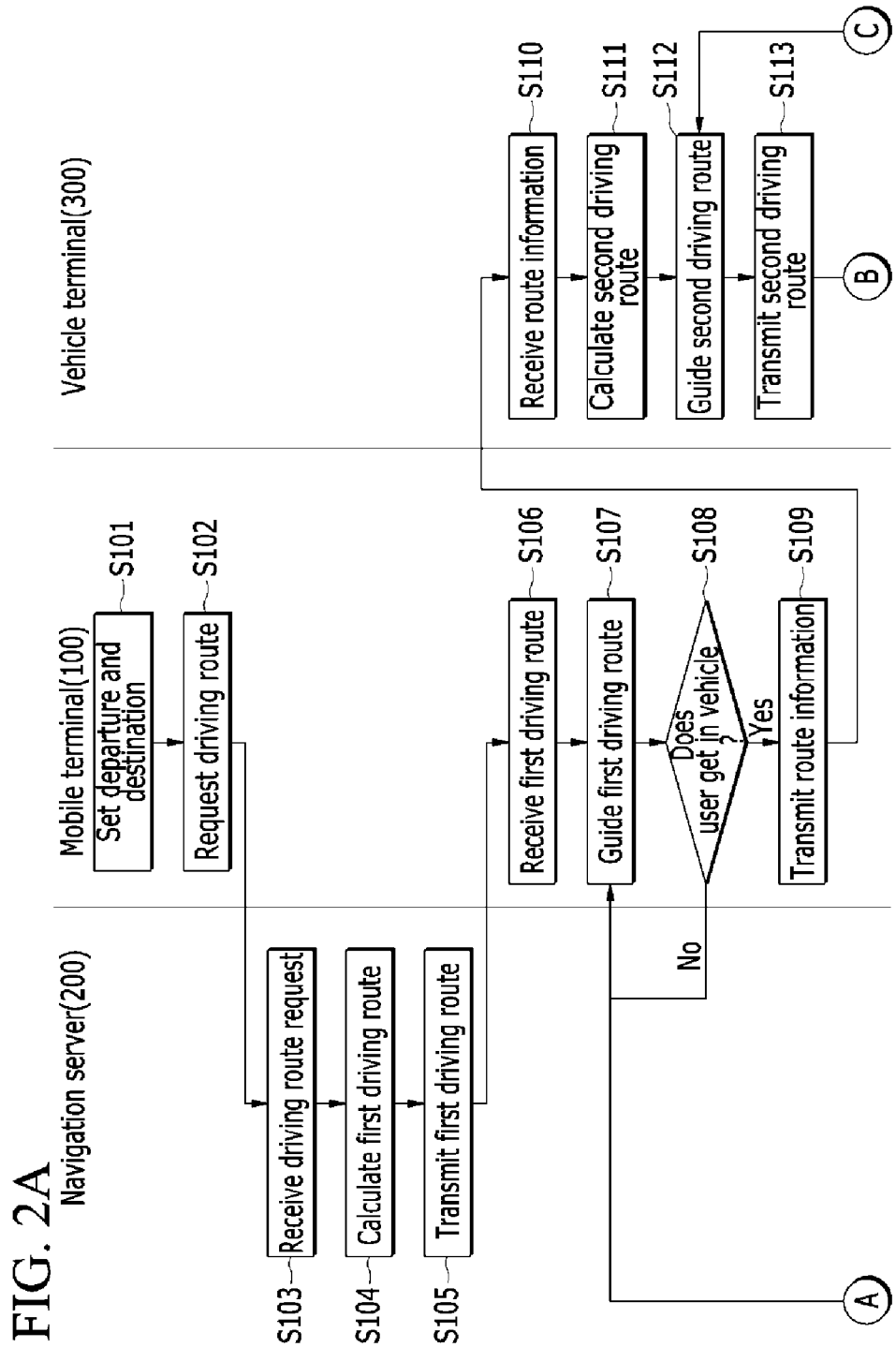

Hereinafter, the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification. Further, detailed description of a widely known technique may be omitted.

In addition, in this specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the specification, a "mobile device" refers to a portable device which is connected to a vehicle terminal through a wired/wireless communication network and includes data communication and navigation functions. For example, the mobile device may include a cellular phone, personal digital assistant (PDA), a smartphone, a notebook computer, or a wearable device.

In this specification, a "vehicle terminal" refers to an in-vehicle terminal which is connected to the mobile terminal through a wired/wireless communication network and includes a navigation function. For example, the vehicle terminal includes one or more of an audio/video/navigation (AVN) terminal, a telematics terminal and an infotainment terminal.

FIG. 1 illustrates a configuration of a navigation interworking apparatus according to an exemplary embodiment of the present disclosure.

Referring to FIG. 1, a mobile terminal 100 may be connected to a navigation server 200 through a wireless communication network and may be connected to a vehicle terminal 300 through a wired/wireless communication network.

In FIG. 1, the mobile terminal 100 may include a first communication unit 110, a second communication unit 120, a departure and destination setting unit 130, a first route requesting unit 140, a first guiding unit 150, a first map database (hereinafter, referred to as 'first map DB') 160, and an interworking control unit 170.

The first communication unit 110 transmits/receives data to/from the navigation server 200 through a wireless communication network. For example a wireless communication network includes broadband wireless communication such as code division multiple access (CDMA), third generation (3G) mobile communication, or long term evolution (LTE, fourth generation mobile communication).

The second communication unit 120 transmits/receives data to/from the vehicle terminal 300 through a wired/wireless communication network. Specifically, according to an exemplary embodiment of the present disclosure, when the vehicle terminal 300 is detected within a wireless communication range of the mobile terminal 100, the mobile terminal 100 and the vehicle terminal 300 are connected through a wired communication network or a wireless communication network. For example, the wireless communication network may include a short range wireless communication such as a Bluetooth, a ZigBee, or WiFi and the wired communication network may include serial wired communication such as USB or RS-2320.

The departure and destination setting unit 130 sets a point of departure and a destination based on information input from the user and global positioning system (GPS) reception information. According to the exemplary embodiment of the present disclosure, the point of departure and the destination are set based on user input information including one or more of a company name, a postal code, a lot number address, a road name address, a phone number, and a photo. Further, according to the exemplary embodiment of the present disclosure, a signal which is transmitted from the GPS server is received to calculate a location of the mobile terminal 100, set the calculated location as a point of departure and set a destination based on the input information of the user.

The first route requesting unit 140 transmits information of the point of departure and the destination set through the departure and destination setting unit 130 to the navigation server 200 to request a first driving route.

The first guiding unit 150 outputs the first driving route transmitted from the navigation server 200 in response to a request of the first route requesting unit 140 based on data stored on the map DB 160. The first guiding unit 150 outputs the first driving route using an image or voice data.

The map DB 160 stores a map image, a road image, voice data, road and address data related with a route guide.

The interworking control unit 170 includes a second route requesting unit 171, a route comparing unit 172, a remaining data amount checking unit 173, and a guide control unit 174.

The second route requesting unit 171 transmits information of the point of departure and the destination set through the departure and destination setting unit 130 to the vehicle terminal 300 and requests a second driving route.

The route comparing unit 172 compares the first driving route transmitted from the navigation server 200 in response to the request of the first route requesting unit 140 and the second driving route transmitted from the vehicle terminal 300 in response to the request of the second route requesting unit 171. Specifically, the route comparing unit 172 determines whether the first driving route coincides with the second driving route.

The remaining data amount checking unit 173 checks a remaining data amount of the mobile terminal 100 based on a flat rate fee option which is subscribed to by the user of the mobile terminal 100. That is, a data quantity which is available for a user of the mobile terminal 100 within a range where an additional cost is not charged based on a month including a data when the remaining data amount is checked is checked.

The guide control unit 174 controls to output the first driving route or the second driving route based on a comparison result of the route comparing unit 172 and the checking result of the remaining data amount checking unit 173.

The navigation server 200 calculates and provides the first driving route in accordance with the request of the mobile terminal 100 and includes a third communication unit 210, a second map database (hereinafter, referred to as "second map DB") 220, a traffic information database (hereinafter, referred to as "traffic information DB"), and a first route calculating unit 230.

The third communication unit 210 receives the information of the point of departure and the destination transmitted from the mobile terminal 100.

The second map DB 220 stores data such as a map image, a coordinate, a road image, a building image, an address, a surveillance camera position, a type of road, and a toll related with the route calculation. The second map DB 220 periodically receives route calculation related data from a map providing server which is connected to the navigation server 200 through the Internet to be updated.

The traffic information DB 230 stores data such as a traffic volume, a congested area, a car accident, or a dangerous factor. The traffic information DB 230 receives road and traffic condition information from a traffic information providing server which is connected to the navigation server 200 through the Internet in real time to be updated.

The first route calculating unit 240 calculates a first driving route corresponding to the information of the point of departure and the destination transmitted from the mobile terminal 100 based on the data stored in the second map DB 220 and the traffic information DB 230. Further, the calculated first driving route is transmitted to the mobile terminal 100 through the third communication unit 210. In this case, when a route calculating option such as a shortest distance, a shortest time, or a freeway is transmitted from the mobile terminal 100, the route calculating option is reflected to calculate the best first driving route. Further, the first route calculating unit 240 periodically calculates the first driving route based on a predetermined time to transmit the first driving route to the mobile terminal 100.

The vehicle terminal 300 calculates and provides the second driving route in accordance with the request of the mobile terminal 100 and includes a fourth communication unit 310, a third map DB 320, a second route calculating unit 330, and a second guiding unit 340.

The fourth communication unit 310 receives the information of the point of departure and the destination transmitted from the mobile terminal 100. Further, the fourth communication unit 310 may receive information which is input by the user through the vehicle terminal 300 and global positioning system (GPS) reception information of the vehicle.

The third map DB 320 stores data such as a map image, a coordinate, a road image, a building image, an address, a surveillance camera position, a type of road, and a toll.

In this case, the third map DB 320 may be updated such that the user directly connects the vehicle terminal 300 to the map providing server or updated using the data which is downloaded from the map providing server or using data received through a digital multimedia broadcasting (DMB) receiver of the vehicle.

The second route calculating unit 330 calculates a second driving route corresponding to the information of the point of departure and the destination transmitted from the mobile terminal 100 based on the data stored in the third map DB 320 and transmits the calculated second driving route to the mobile terminal 100 through the fourth communication unit 310.

The second guiding unit 340 outputs the second driving route calculated through the second route calculating unit 330 using an image or voice data. Further, the second guiding unit 340 may output the first driving route which is transmitted from the mobile terminal 100.

FIG. 2A and FIG. 2B illustrate a navigation interworking method using the navigation interworking apparatus of FIG. 1.

First, a point of departure and a destination may be set through a departure and destination setting unit 130 of a mobile terminal 100 in step S101 and information of a point of departure and a destination to a navigation server 200 through a first route requesting unit 140 in step S102.

The navigation server 200 receives the information of the point of departure and the destination which is transmitted in step S102 (step S103) and calculates a first driving route corresponding to the point of departure and the destination which are received through the route calculating unit 240 received in step S103 (step S104). Next, the calculated first driving route is transmitted to the mobile terminal 100 in step S105.

The mobile terminal 100 receives the first driving route transmitted in step S105 (S106) and outputs the received first driving route through the first guiding unit 150 in step S107.

Next, it is determined whether a user of the mobile terminal 100 gets into the vehicle in step S108. In step S108, when the mobile terminal 100 is connected to the vehicle terminal 300 through a wired communication network or a wireless communication network, it is determined that the user gets into the vehicle and when the mobile terminal 100 is not connected to the vehicle terminal 300 through a communication network, it is determined that the user does not get into the vehicle.

When it is determined that the user gets into the vehicle as a determination result in step S108, the information of the point of departure and the destination is transmitted to the vehicle terminal 300 through the second route requesting unit 171 in step S109.

The vehicle terminal 300 receives the information of the point of departure and the destination transmitted in step S109 (step S110) and calculates a second driving route corresponding to the point of departure and the destination received through the second route calculating unit 330 in step S110 (step S111). Next, the calculated second driving route is output through a second guiding unit 340 in step S112 and transmitted to the mobile terminal 100 in step S113.

The mobile terminal 100 receives the second driving route which is transmitted in step S113 (step S114) and determines whether the first driving route coincides with the second driving route through the route comparing unit 172 in step S115.

When the first driving route coincides with the second driving route as a determination result in step S115, outputting of the first driving route in step S107 ends through the guide control unit 174 in step S116.

When the first driving route does not coincide with the second driving route, a remaining data amount is checked by a remaining data amount checking unit in step S117. As a checking result in step S117, when the remaining data amount of the mobile terminal 100 is smaller than a predetermined threshold value, the first driving route is transmitted to the vehicle terminal 300 in step S118 and outputting of the first driving route in step S107 ends through the guide control unit 174 in step S119.

The vehicle terminal 300 determines whether the first driving route is received in step S120 and when the first driving route is received, outputs the first driving route through the second guiding unit 340 in step S121. When it is determined that the first driving route is not received as a determination result in step S120, the second driving route is continuously output.

According to a navigation interworking method of FIG. 2, when the driving routes provided by the mobile terminal 100 and the vehicle terminal 300 coincide with each other, a driving route guiding function of the mobile terminal 100 ends and the driving route is guided by the vehicle terminal 300, thereby improving a readability by a driver and saving data and a battery of the mobile terminal 100. Further, when the driving routes provided by the mobile terminal 100 and the vehicle terminal 300 do not coincide with each other, the first driving route of the mobile terminal 100 is guided by the vehicle terminal 300, thereby providing a best driving route in which real time traffic information is reflected to the driver.

FIG. 3 illustrates a configuration of a navigation interworking apparatus according to another exemplary embodiment of the present disclosure.

Referring to FIG. 3, a mobile terminal 400 is connected to a vehicle terminal 500 through a wired/wireless communication network. In this case, the mobile terminal 100 is a mobile terminal and the vehicle terminal 300 is a vehicle terminal.

In FIG. 3, the mobile terminal 400 includes a first communication unit 410, a departure and destination setting unit 420, a first route calculating unit 430, a first guiding unit 440, a first map DB 450, and an interworking control unit 460.

The first communication unit 410 transmits/receives data to/from the vehicle terminal 500 through a wired/wireless communication network. Specifically, according to an exemplary embodiment of the present disclosure, when the vehicle terminal 300 is detected within a wireless communication range of the mobile terminal 100, the mobile terminal 100 and the vehicle terminal 300 are connected through a wired communication network or a wireless communication network.

The departure and destination setting unit 420 sets a point of departure and a destination based on information input from the user and global positioning system (GPA) reception information.

The first map DB 430 stores data such as a map image, a road image, a building image, an address, a surveillance camera position, a type of road, a cost, and voice data.

The first route calculating unit 440 calculates a first driving route corresponding to data stored in the first map DB 430 and information of a point of departure and a destination set by the departure and destination setting unit 420.

The first guiding unit 450 outputs the first driving route using an image and voice data.

The interworking control unit 460 includes a route requesting unit 461, a route comparing unit 462, a remaining battery amount checking unit 463, and a guide control unit 464.

The route requesting unit 461 transmits the information of the point of departure and the destination set in the departure and destination setting unit 420 to the vehicle terminal 500 and requests a second driving route.

The route comparing unit 462 compares the first driving route calculated by the first route calculating unit 440 and the second driving route transmitted from the vehicle terminal 500 in response to the request of the route requesting unit 461. In this case, the route comparing unit 172 compares the first driving route and the second driving route to determine whether the first driving route coincides with the second driving route.

The remaining battery amount checking unit 463 checks the remaining battery amount of the mobile terminal 400.

The guide control unit 464 controls to output the first driving route or the second driving route through the first guiding unit 450 based on a comparison result of the route comparing unit 462 and a checking result of the remaining data amount checking unit 463.

The vehicle terminal 500 calculates and provides the second driving route in accordance with the request of the mobile terminal 400 and includes a second communication unit 510, a second map DB 520, a second route calculating unit 530, and a second guiding unit 540.

The second communication unit 510 receives the information of the point of departure and the destination transmitted from the mobile terminal 400.

The second map DB 520 stores data such as a map image, an address, a surveillance camera position, a type of road, and a toll related with the route calculation. In this case, the second map DB 520 may be updated such that the user directly connects the vehicle terminal 500 to the map providing server or updated using the data which is downloaded from the map providing server or using data received through a digital multimedia broadcasting (DMB) receiver of the vehicle.

The second route calculating unit 530 calculates a second driving route corresponding to the information of the point of departure and the destination transmitted from the mobile terminal 400 based on the data stored in the second map DB 520 and transmits the calculated second driving route to the mobile terminal 400 through the second communication unit 510.

The second guiding unit 540 outputs the second driving route calculated through the second route calculating unit 530 using an image or voice data. Further, the second guiding unit 440 may output the first driving route which is transmitted from the mobile terminal 400.

Figure 4A:
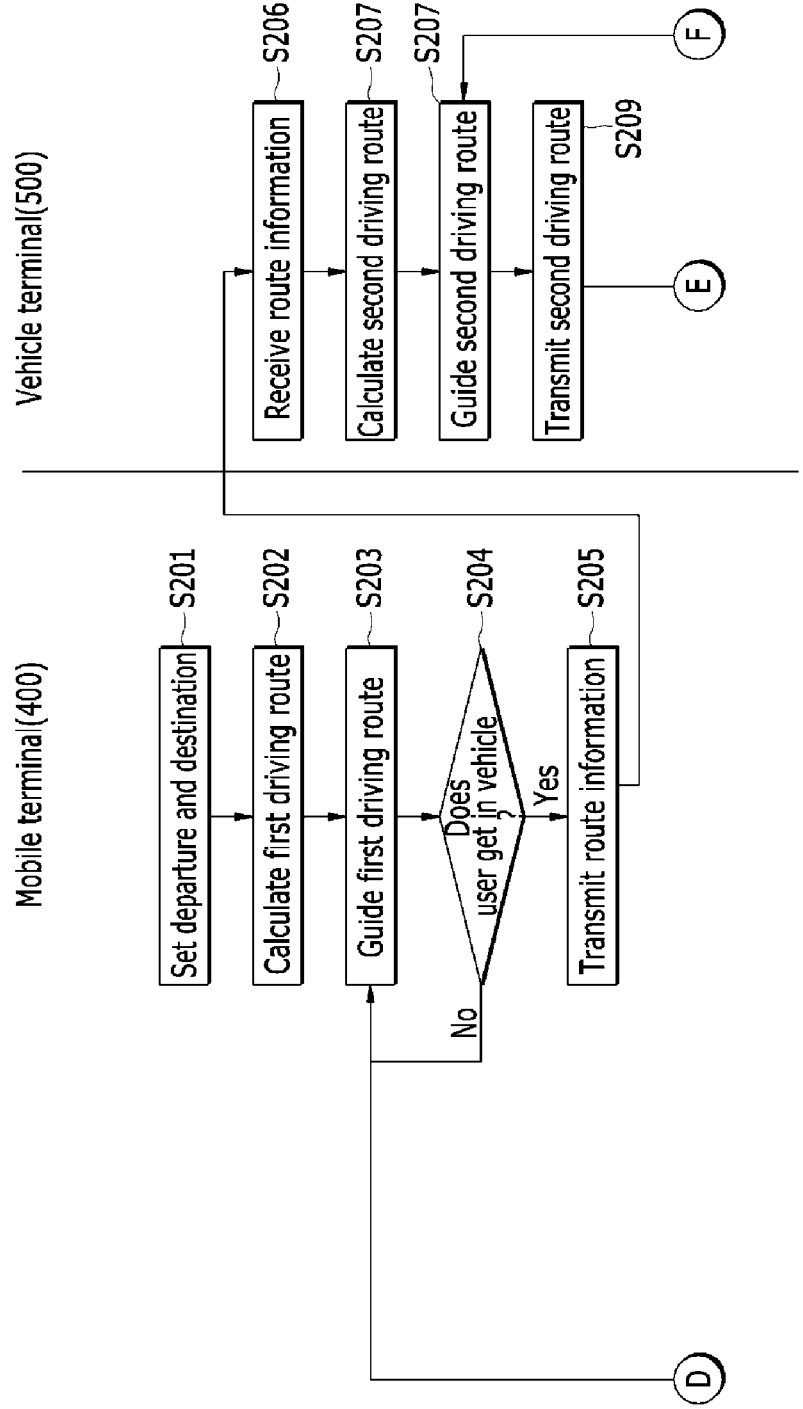
FIG. 4A and FIG. 4B illustrate a navigation interworking method using the navigation interworking apparatus of FIG. 3.
Figure 4B:
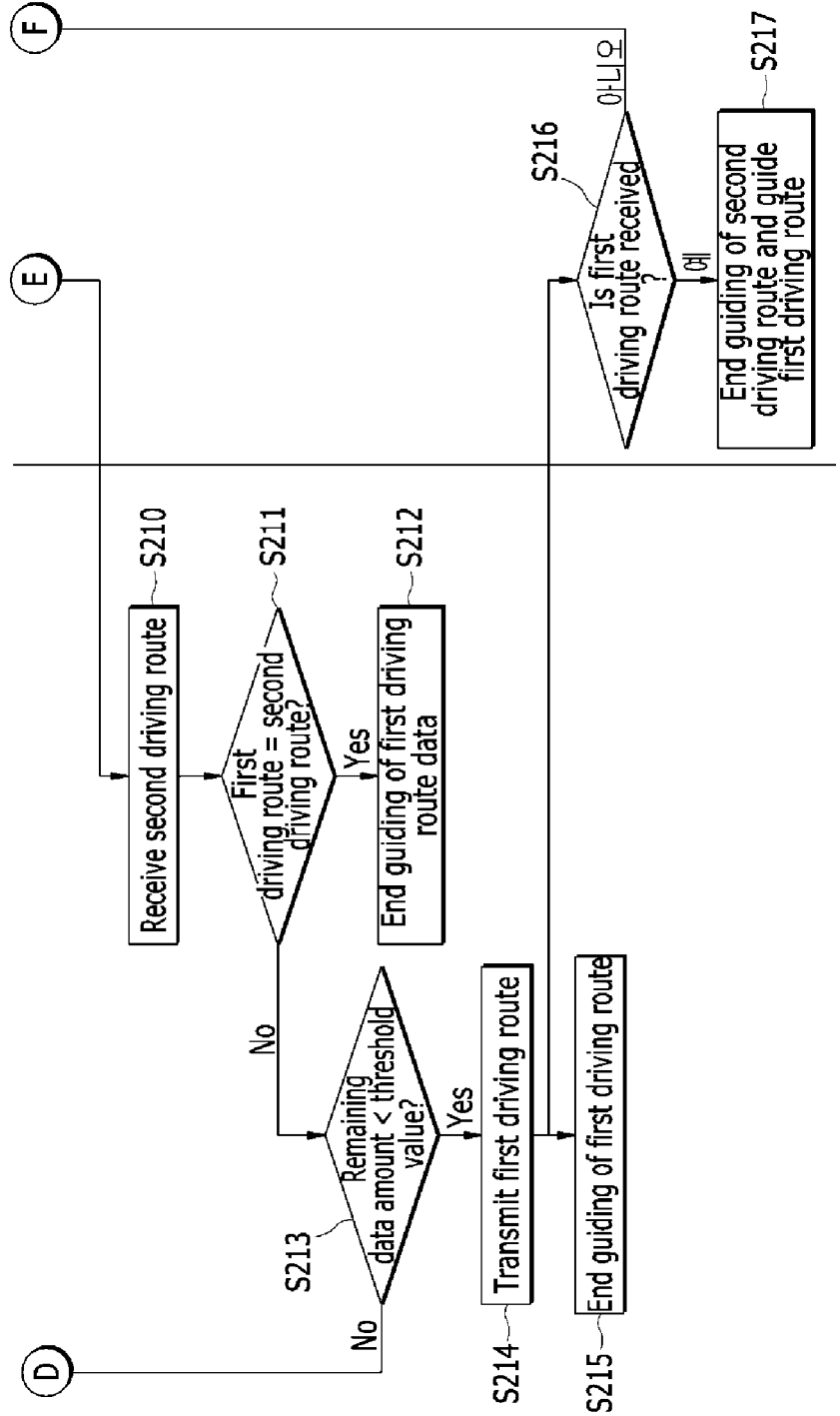

FIG. 4A and FIG. 4B illustrate a navigation interworking method using the navigation interworking apparatus of FIG. 3.

In FIG. 4A and FIG. 4B, a mobile terminal 400 calculates a first driving route based on information of a point of departure and a destination set in step S201 (step S202) and compares the second driving route received from the vehicle terminal 500 and a first driving route calculated in step S202 (step S211). Next, when the first driving route does not coincide with the second driving route, a remaining battery amount of the mobile terminal 400 is compared with a threshold value in step S213 and when the remaining battery amount is smaller than the threshold value, the first driving route is transmitted to the vehicle terminal 500 in step S214, which is different from the navigation interworking method of FIG. 2.

Since steps S206 to S209, step S216, and step S217 of FIG. 4A and FIG. 4B are substantially the same as steps S110 to S113, step S120, and step S121 of FIG. 2A and FIG. 2B, redundant description will be omitted.

According to a navigation interworking method of FIG. 4A and FIG. 4B, when the driving routes provided by the mobile terminal 400 and the vehicle terminal 500 coincide with each other, a driving route guiding function of the mobile terminal 400 ends and the driving route is guided by the vehicle terminal 500, thereby improving a readability of a driver and saving consumption of a battery of the mobile terminal 400.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A navigation interworking apparatus for a mobile terminal which is connected to a navigation server through a first communication network and connected to a vehicle terminal through a second communication network, the apparatus comprising a first processor that is configured to:
    set a point of departure and a destination;
    transmit the set point of departure and the set destination to the navigation server;
    receive a first driving route corresponding to the point of departure and the destination which are transmitted from the navigation server;
    output the first driving route through the mobile terminal;
    receive a second driving route corresponding to the point of departure and the destination from the vehicle terminal;
    compare the first driving route and the second driving route;
    end outputting of the first driving route in response to a comparison result where the first driving route and the second driving route coincide with each other;
    check a remaining data amount left on a mobile device subscription plan when the first driving route is different from the second driving route; and
    end outputting of the first driving route through the mobile terminal in response to a result of checking the remaining data amount,
    wherein when the remaining data amount is smaller than a predetermined threshold value as the result of checking the remaining data amount, the first processor ends the outputting of the first driving route and transmits the first driving route to the vehicle terminal to output the first driving route through the vehicle terminal.

2. The navigation interworking apparatus of claim 1, wherein the vehicle terminal includes a second processor that is configured to:
   calculate a second driving route corresponding to the point of departure and the destination; and
   output the first driving route or the second driving route.

3. The navigation interworking apparatus of claim 2, wherein the second processor of the vehicle terminal is further configured to receive the point of departure and the destination transmitted from the mobile term.

4. The navigation interworking apparatus of claim 1, wherein the first processor is further configured to compare a remaining battery amount of the mobile terminal and the predetermined threshold value, and when the remaining battery amount is smaller than the threshold value as a result of checking the remaining battery amount, the first processor is configured to end the outputting of the first driving route.

* * * * *